Sept. 8, 1959      E. P. HURD      2,903,300
WHEEL COVER
Filed May 27, 1954      2 Sheets-Sheet 1
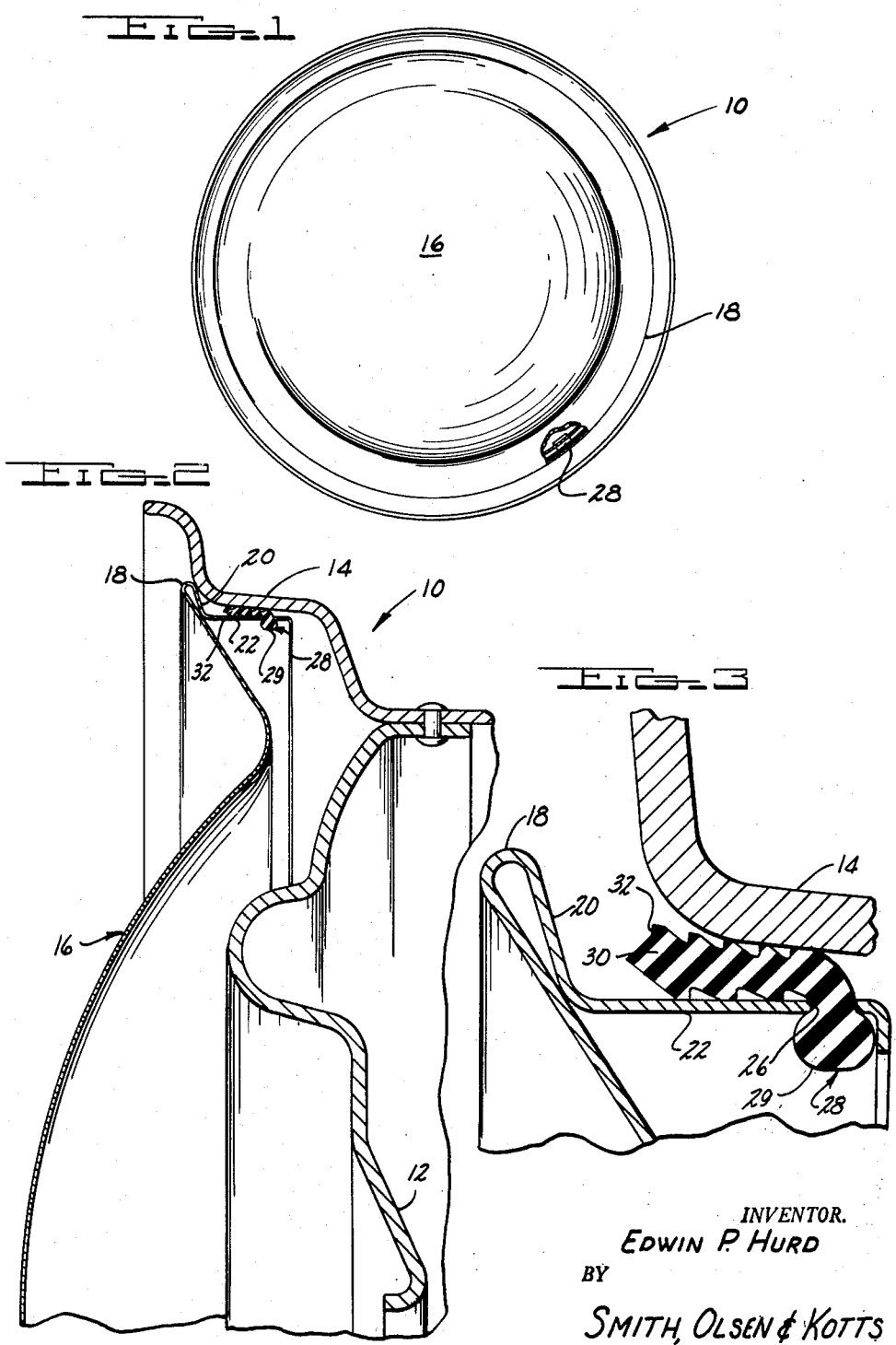
INVENTOR.
EDWIN P. HURD
BY
SMITH, OLSEN & KOTTS
ATTORNEYS Sept. 8, 1959  E. P. HURD  2,903,300
WHEEL COVER
Filed May 27, 1954  2 Sheets-Sheet 2
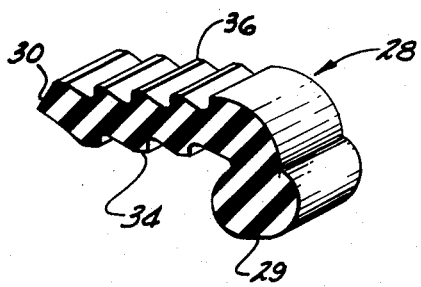
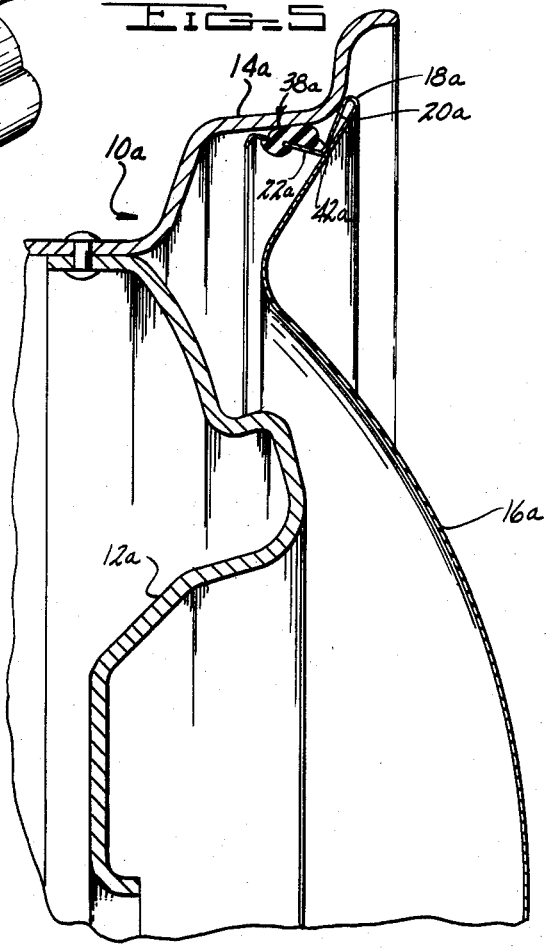
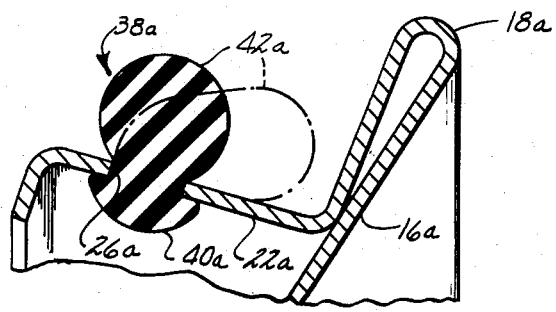
INVENTOR.
EDWIN P. HURD
BY
SMITH, OLSEN & KOTTS
ATTORNEYS

United States Patent Office 2,903,300
Patented Sept. 8, 1959

2,903,300

WHEEL COVER

Edwin P. Hurd, Detroit, Mich., assignor to Hurd Lock & Manufacturing Company, Detroit, Mich., a corporation of Michigan Application May 27, 1954, Serial No. 432,878

11 Claims. (Cl. 301—37)

The present invention relates to improvements in automobile wheel assemblies and more particularly concerns wheel covers of the self retaining type.

There are several types of structures now used in the art for retaining full wheel covers on automobile wheels. Perhaps the most common is the type employing biting fingers which engage one of the axially extending flanges of the wheel rim. The fingers are inclined so that they allow the cover to be pressed in place and allow the same to be pried off when desired.

While satisfactory service has generally been obtained with this type of retaining structure, certain inherent defects have been found. On occasions it has been necessary to make changes in the designs of the retaining fingers because in recent years the same quality of steel has not always been available for use by manufacturers of wheel covers. As it is well known to persons skilled in the art, certain resilient characteristics must be present in these biting finger retaining means, which characteristics are directly related to the quality and composition of the metal. In addition, rather close tolerences must be maintained between the wheel rim and the cover retaining means so that the cover can be removed without permanently damaging the retaining fingers and so that the cover will not free itself from the wheel rim while the automobile is in motion. With respect to the latter, it should be borne in mind that even though the cover retaining means may be accurately formed, the rim structures to which they must be attached will not necessarily be uniform. Thus, the retaining means must be able to accommodate for these irregularities or the cover may not be securely held in place.

It is an object of the present invention to overcome these and other defects of the prior art devices and to provide a self retaining wheel cover which is constructed and arranged so that it can be pressed on and pried off an associated wheel rim without appreciable damage to the retaining means and which can accommodate a wider range of tolerances between the wheel rim attaching surface and such retaining means than was practically possible with the prior art devices.

It is another object of the present invention to provide a wheel cover of the foregoing character which has retaining means whose retaining characteristics are not directly related to the properties of the material used to form the wheel cover so that various grades of steel, or plastic materials and the like may be used in manufacturing the wheel cover without affecting to any great extent the self retaining characteristics of the cover.

It is still another object of the present invention to provide a wheel cover of the foregoing character which is constructed and arranged so that it can be economically manufactured and in which the materials used in its manufacture are relatively low in cost.

Other objects of this invention will appear in the following description and appended claims, reference being had to the accompanying drawings forming a part of this specification wherein like reference characters designate corresponding parts in the several views.

In the drawings:

Figure 1 is a plan view of a wheel assembly including a wheel cover embodying the present invention;

Figure 2 is a sectional view of the embodiment shown in Figure 1;

Figure 3 is an enlarged fragmentary view showing one retaining element as the cover is being pressed into place on the wheel rim;

Figure 4 is a perspective view of a strip of rubber material from which the retaining element shown in Figure 3 can be cut;

Figure 5 is a sectional view similar to that of Figure 2 of another embodiment of the present invention; and Figure 6 is a fragmentary enlargement of the retaining means in a free position of the embodiment illustrated in Figure 5.

Before explaning the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, and first to Figures 1 to 4, a more detailed description of the invention will be given. The reference number 10 indicates generally a conventional multi-flanged or stepped drop center type of tire rim which is fastened to a conventional wheel hub part 12. The tire rim 10 has an intermediate generally axially extending flange 14 to which the wheel cover 16 is attached by the retaining means, to be described, which are disposed around the periphery of cover 16.

The cover 16 at its outer periphery includes a turned flange structure 18 which includes a generally radially inwardly projecting portion 20 which terminates in a generally axially extending terminal portion 22. The axial portion 22 preferably is in the form of a sleeve having a rear edge which is substantially in one plane, although it will be understood that the present invention isn't limited to this construction. Thus, rearwardly extending arm like portions could also be used and are to be considered as coming within the scope of the claimed invention.

The axial portion 22 has a plurality of apertures 26 therein, such apertures being uniformly spaced around the circumference of axial portion 22. Extending into apertures 22 are a plurality of resilient rubber elements 28 which have enlarged rubber heads 29, which can be worked through apertures 26. Thereafter the neck portions of the elements 28 will be held in place by the edges forming apertures 22.

The elements 28 can be obtained from a strip of extruded rubber material 30 as is shown in Figure 4. The individual elements 28 can be cut to the length of the apertures 26 so that such elements will be retained in place in the axial portion 22 once their heads have been pressed through apertures 26.

When each element 28 is mounted in its aperture 26, the tongue-like portion or free end 32 will be on the radially outer side of the axial portion 22 where it can be wedged between the latter and the rim flange 14. The tongue-like portion or free end 32 preferably has serrations 34 and 36 formed on opposite sides during the extruding process. Those on the inner side are inclined toward the head 29, while those on the outer side are inclined in the opposite direction. They are also in staggered relation so that when the cover 16 is pressed on the rim 10 the serrations 34 and 36 will be sandwiched together so as to permit the cover 16 to be easily pressed on. However, when the cover 16 is to be removed the serrations 34 and 36 will oppose such movement, thereby tending to transversely align the opposite serrations as contrasted with them remaining in staggered relation. This will further resist the forces tending to remove the cover 16 because as the serrations are twisted so that opposite pairs are in transverse alignment the element will tend to become thicker. Thus, they will yield when the cover 16 is pressed into place but will oppose removal of the same.

Figures 5 and 6 show another embodiment of the present invention. Here similar reference numbers designate similar parts. The resilient elements 38a are molded preferably from rubber and have a round cross section throughout their lengths. A rivet-like rubber head 40a can be pressed through the aperture 26a after which the head 40a will retain the same in place. The tongue-like portion or free end 42a of this resilient element is spherical in shape, and when the cover 16a is pressed into place on the rim 10a it will be deflected toward the front side of the cover 16a as is shown in Figure 5 and in phantom in Figure 6. As shown, the tongue-like portion or free end 42a is squeezed between the rim flange 14a and the cover axial portion 22a and by virtue of its deflection it will oppose removal of the cover 16a. It will operate in much the same manner as the previously described embodiment in that it will provide an easy on-hard off arrangement. Thus, when the cover 16a is pressed on, the element 38a will be stretched so as to be somewhat thinner or smaller in diameter, but when the cover 16a is being removed, the element 38a will roll upon itself thereby tending to swell out. This will make it more difficult for the cover 16a to be removed.

From the foregoing descriptions of the disclosed embodiments of the present invention, it can be understood that the resilient elements 28 and 38a can be compressed between the cover axial portion and the wheel flange for holding the cover in place. This retaining operation will materially be improved by the manner in which the resilient elements are shaped and deflected during the step of pressing the cover in place on the wheel assembly. Furthermore, the resilient elements, by virtue of their compressibility can accommodate varying tolerances between the cover and the rim thereby assuring proper self retaining characteristics of such cover.

While it is desired to have certain resilient characteristics in the covers 16 or 16a, and particularly in the axial portions 22 or 22a, nevertheless it can be seen that the same high qualities of steel as required by many of the prior art devices need not be used with the present invention because of the resilient properties of the elements 28 and 38a. Thus, the present covers can be manufactured at relatively low costs while providing excellent self retaining means.

Having thus described my invention, I claim:

1. A circular wheel cover having concealed behind the outer margin thereof a return bent generally radially inwardly extending flange terminating in a generally axially rearwardly extending flange portion, said flange portion having around its outer side a plurality of resilient rubber-like elements for retaining the cover on a vehicle wheel, each of said elements having a substantial portion of its length projecting outward of said flange portion to form a tongue with transverse serrations on the axially rearward and forward sides thereof so that each tongue can be folded over in an axially outward direction between said side and a wheel rim when the cover is pressed onto said rim and the ridges of said serrations will tend to be squeezed into the adjacent hollows of said serrations, and when an effort is made to withdraw the cover the ridges will tend to be squeezed back upon themselves thereby causing the elements to become thicker in a radial direction.

2. A circular wheel cover having concealed behind the outer margin thereof a return bent generally radially inwardly extending flange terminating in a generally axially rearwardly extending flange portion, said flange portion having spaced openings around its circumference, and a plurality of resilient rubber-like elements in said openings for retaining the cover on a vehicle wheel, each of said elements having an enlarged head at one end located on the inner side of said flange portion and a relatively longer tongue-like portion projecting outwardly from said flange portion, said relatively longer tongue-like portion having transverse serrations on the axially rearward and forward sides thereof so that each tongue can be molded over in an axially outward direction between said side and a wheel rim when the cover is pressed onto said rim and the ridges of said serrations will tend to be squeezed into the adjacent hollows of said serrations, and when an effort is made to withdraw the cover the ridges will tend to be squeezed back upon themselves thereby causing the elements to become thicker in a radial direction.

3. A circular wheel cover having a generally rearwardly extending flange portion, said flange portion having spaced openings around its circumference, and a plurality of resilient rubber-like elements in said openings for retaining the cover on a vehicle wheel, each of said elements having an enlarged head at one end located on the inner side of the flange portion and a relatively longer tongue-like portion projecting outwardly from said flange portion, said relatively longer tongue-like portion having transverse corrugations so that it can be folded over in an axially outward direction between said flange portion and a wheel rim when the cover is pressed onto said rim and the ridges of said corrugations will tend to be squeezed into the adjacent hollows of said corrugations, and when an effort is made to withdraw the cover the ridges will tend to be squeezed back upon themselves thereby causing the elements to become thicker in a radial direction.

4. In a cover for disposition at the outer side of a vehicle wheel including a tire rim having an axially extending flange, a cover member having a generally axially extending peripheral portion adapted to fit within said axially extending flange when the cover is pressed on the wheel, and a plurality of resilient rubber-like elements fastened to said peripheral portion and extending radially therefrom forming a tongue-like portion which is folded substantially entirely in an axially outward direction between the flange and the peripheral portion when the cover member is pressed into place on the wheel, said elements having transverse corrugations on the axially inward and outward sides thereof so that when the cover member is pressed onto said axially extending flange the ridges of the corrugations will tend to flow into the adjacent hollows of the corrugations and when an effort is made to pull the cover member from the rim the ridges will tend to roll back upon themselves thereby tending to increase the thickness of the tongue-like elements and resist removal of the cover member.

5. In a cover for disposition at the outer side of a vehicle wheel including a tire rim having an axially extending flange, a cover member having a generally axially extending resilient sleeve adapted to fit within said flange in a close spaced relation, and a plurality of resilient rubber-like elements fastened to the outer periphery of said resilient sleeve, each rubber-like element having a tongue-like portion adapted to be folded substantially entirely in an axially outward direction to a position between the flange and sleeve when the latter is fitted within the former, the resilient characteristics of the sleeve urging the tongue-like portions tightly against the rim flange, each tongue-like portion having transverse corrugations on its surfaces which are adapted to engage the rim flange and the sleeve, the ridges of the corrugations being shaped so that they will be squeezed into the hollows of the corrugations when the sleeve is pressed into the rim flange and when the sleeve is pulled from the rim flange the ridges will tend to roll back upon themselves thereby causing the tongue-like elements to become thicker and resist removal of the cover from the wheel.

6. In a vehicle wheel assembly, the combination of a multi-flange rim having an axial flange, and a circular cover member having a rearwardly extending peripheral portion telescopically fitting within said axial flange in close spaced relation, and a plurality of resilient elements disposed between the axial flange and the peripheral portion and fastened to one of them, each of said elements having tongue-like portions extending in a generally radial direction from the part to which the elements are fastened so that when the cover member is fitted within the axial flange each tongue-like portion will be folded over and will be snugly engaged between the axial flange and the peripheral portion, each tongue-like portion having transverse corrugations on its surfaces engaged by the rim flange and the peripheral portion, the ridges of the corrugations being shaped so that they will be squeezed into the hollows of the corrugations when the peripheral portion is pressed into the axial flange and when the peripheral portion is pulled from the axial flange the ridges will tend to roll back upon themselves thereby causing the tongue-like elements to become thicker and resist removal of the cover from the rim.

7. In a vehicle wheel assembly, the combination of a rim having an axial flange, a circular cover member having a rearwardly extending peripheral portion telescopically fitting within said axial flange in close spaced relation, and a plurality of resilient elements fastened around the outer side of said peripheral portion, said resilient elements having tongue-like portions occupying when in their unconfined states positions which extend beyond a circle of the same diameter as said axial flange so that when said peripheral portion is pressed into the axial flange the free ends of said tongue-like portions will be deflected in the opposite direction and will be squeezed and elongated between said flange and peripheral portion, each of said tongue-like portions having at least one enlarged portion with a cross-sectional area of greater dimension than another portion closer to the fastened end of the tongue-like portion so that when the cover member is withdrawn from said rim the enlarged portion will tend to roll back upon itself thereby causing the elements to seek to increase the diameter of the circle they occupy.

8. The combination of claim 7 wherein the tongue-like portions of said resilient elements projecting radially outward from said peripheral portion are spherical in shape and are made from a rubber-like material.

9. The combination of claim 7 wherein the tongue-like portions of said resilient elements projecting radially outward from said peripheral portion have transverse corrugations and are made from a rubber-like material.

10. The combination of claim 7 wherein the portions of said tongue-like portions projecting outward from the peripheral portion have corrugated surfaces.

11. The combination of claim 10 wherein the corrugations in opposite surfaces are out of phase with one another.

References Cited in the file of this patent

UNITED STATES PATENTS

| | | |
|---|---|---|
| 984,808 | Glocker | Feb. 21, 1911 |
| 1,969,088 | Maranville | Aug. 7, 1934 |
| 2,076,789 | Le Jeune | Apr. 13, 1937 |
| 2,212,804 | Wynings | Aug. 27, 1940 |
| 2,615,741 | Nathan | Oct. 28, 1952 |
| 2,618,513 | Horn | Nov. 18, 1952 |
| 2,736,610 | Waite | Feb. 28, 1956 |